United States Patent [19]

Zeidler et al.

[11] 4,188,802
[45] Feb. 19, 1980

[54] ELASTIC SHAFT PLATE FOR SHAFT COUPLINGS

[75] Inventors: Gerhard Zeidler; Günther Ziegler, both of Waldkraiburg, Fed. Rep. of Germany

[73] Assignee: SGF Suddeutsche Gelenkscheibenfabrik GmbH & Co. KG, Waldkraiburg, Fed. Rep. of Germany

[21] Appl. No.: 874,800

[22] Filed: Feb. 3, 1978

[30] Foreign Application Priority Data

Feb. 10, 1977 [DE] Fed. Rep. of Germany ....... 2705598

[51] Int. Cl.² ........................... F16D 3/58; F16D 3/62
[52] U.S. Cl. ............................................. 64/12; 64/19
[58] Field of Search ................ 64/12, 19, 11 R, 11 F

[56] References Cited

U.S. PATENT DOCUMENTS 4,118,952  10/1978  Kobayashi .................. 64/12

FOREIGN PATENT DOCUMENTS

| | | | |
|---|---|---|---|
| 530472 | 9/1956 | Canada | 64/12 |
| 2060868 | 7/1971 | Fed. Rep. of Germany | 64/12 |
| 982115 | 6/1951 | France | 64/12 |
| 1049411 | 12/1953 | France | 64/12 |
| 366848 | 9/1938 | Italy | 64/12 |
| 291590 | 9/1953 | Switzerland | 64/12 |
| 752815 | 7/1956 | United Kingdom | 64/12 |

*Primary Examiner*—Charles J. Myhre
*Assistant Examiner*—R. C. Turner
*Attorney, Agent, or Firm*—Eyre, Mann, Lucas & Just

[57] ABSTRACT

An elastic shaft plate for shaft couplings comprises sleeves disposed angularly spaced around a shaft plate axis. The sleeves are wrapped in pairs by string coils and embedded together with the coils in an elastomeric material. At least one sleeve of each pair of sleeves wrapped by a common string coil is an external sleeve receiving an internal body adapted to be fixed to one of two shafts to be coupled by the elastic shaft plate. A spacing is provided between said external sleeve and said internal body, said spacing likewise containing an elastomeric material.

11 Claims, 10 Drawing Figures

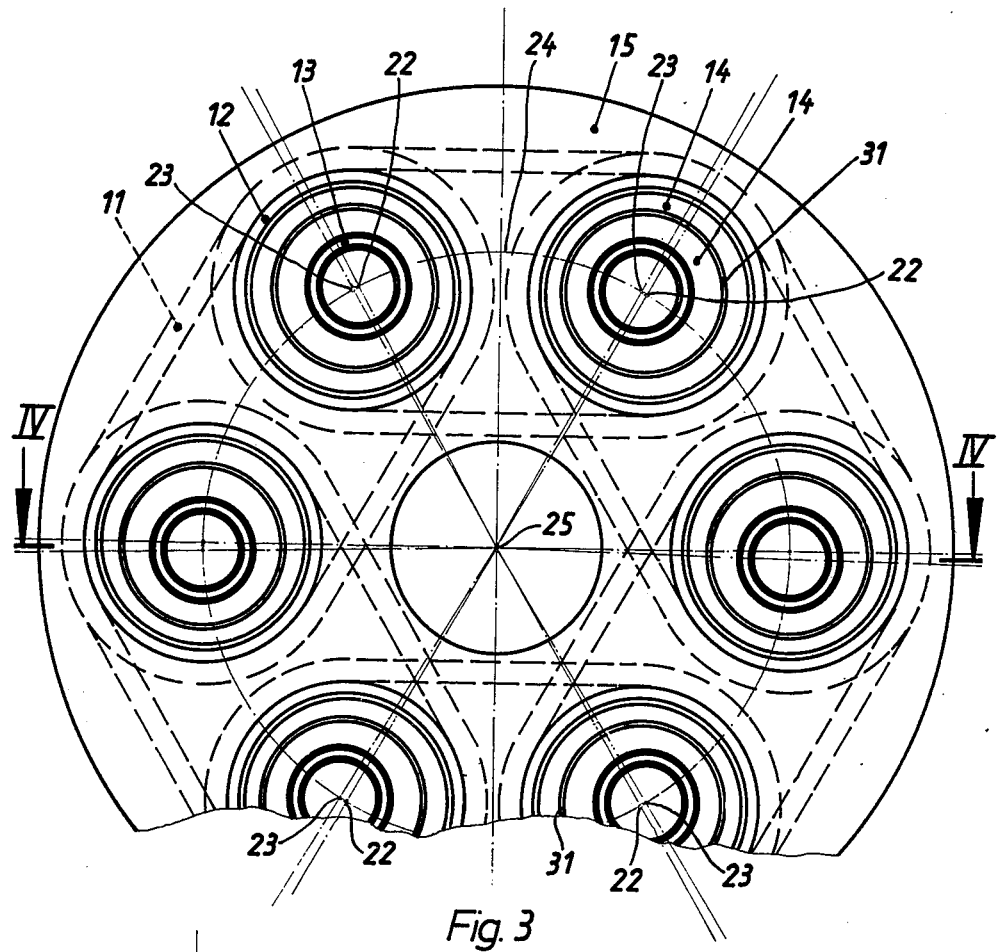
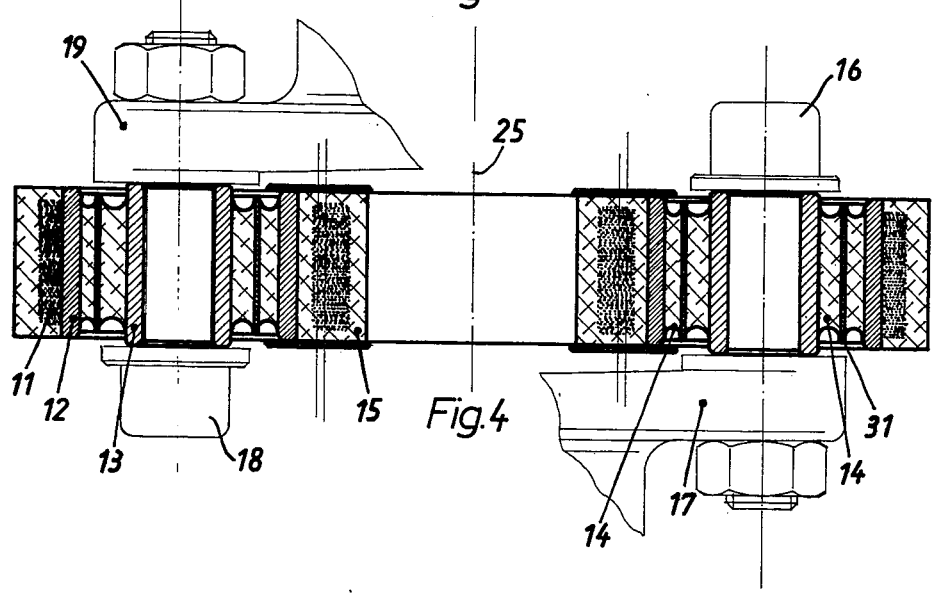

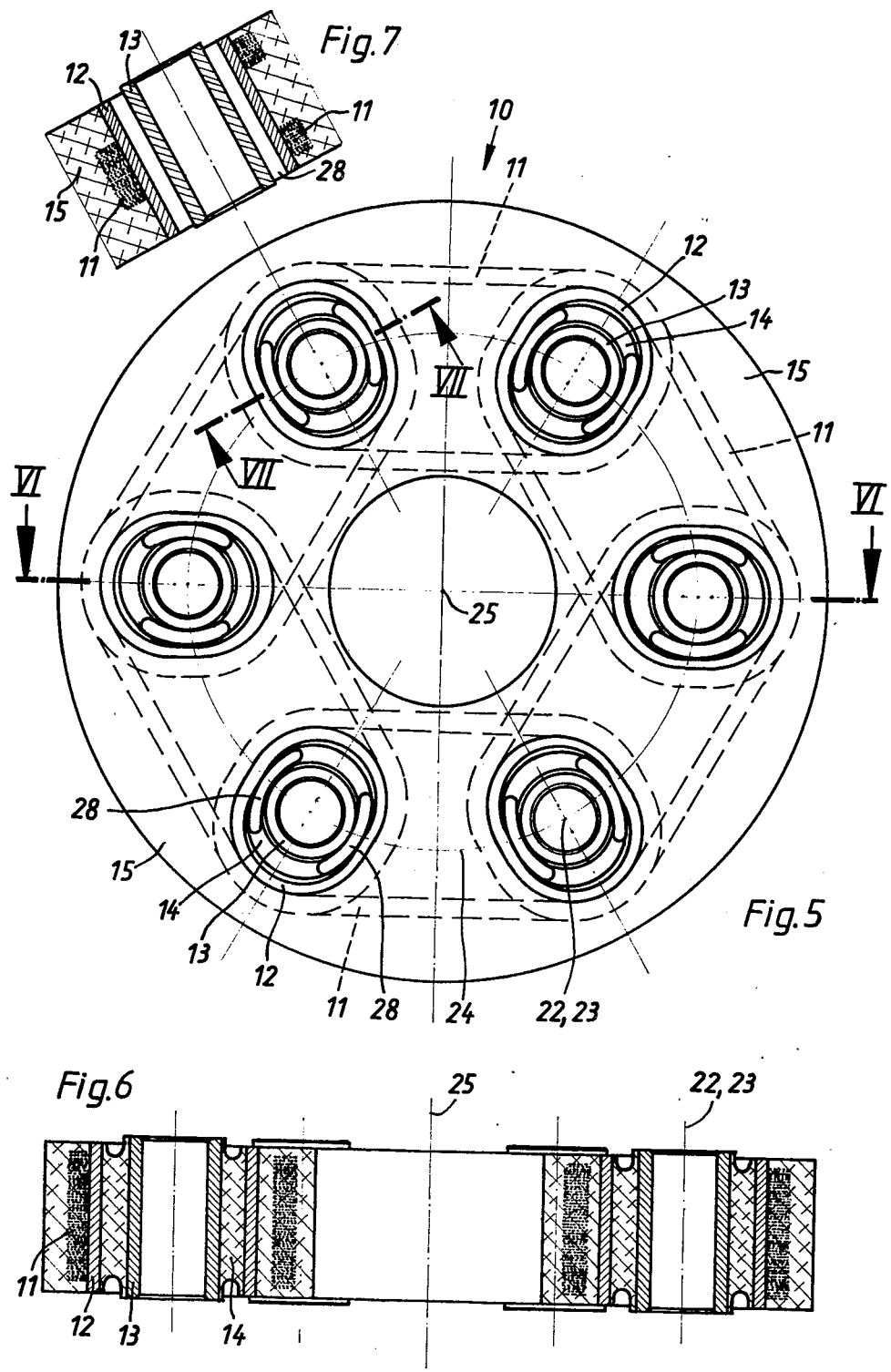

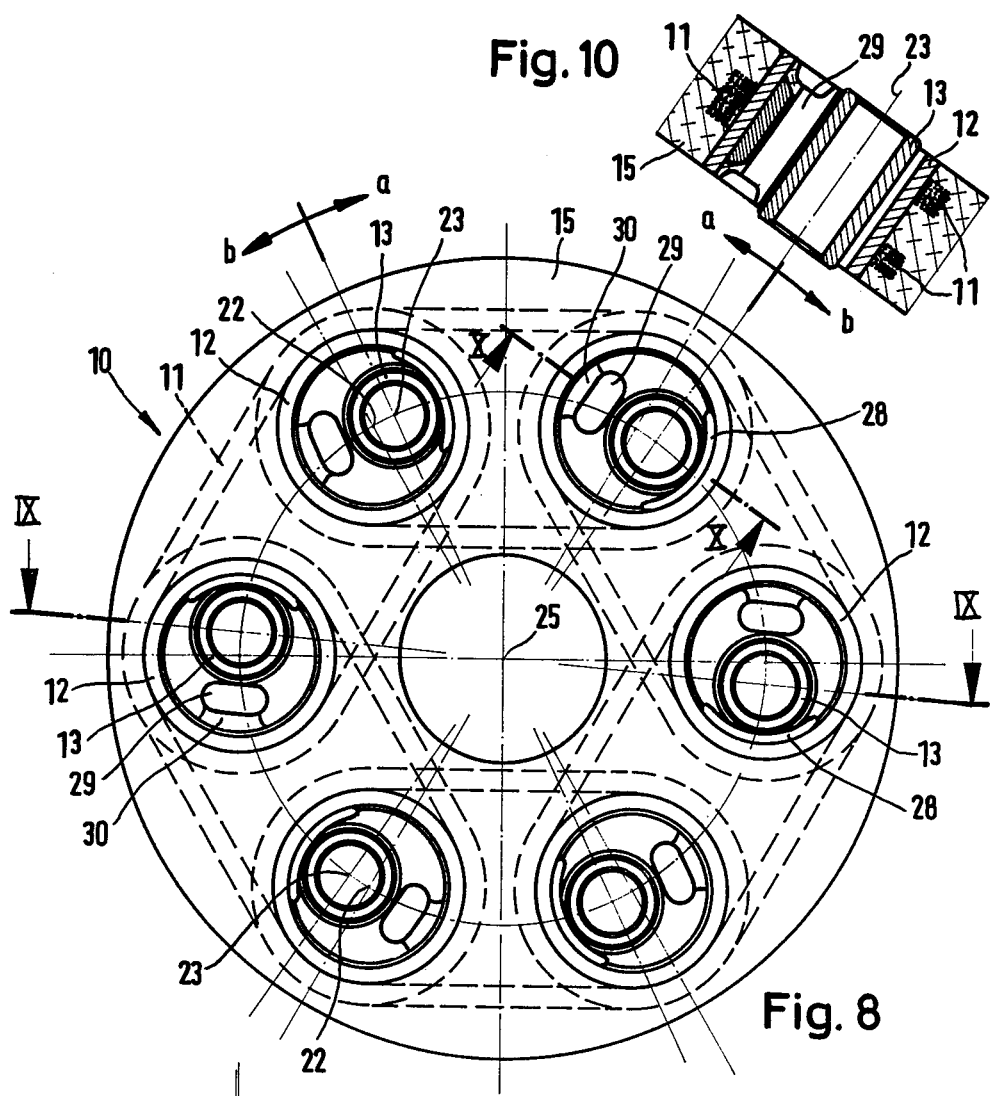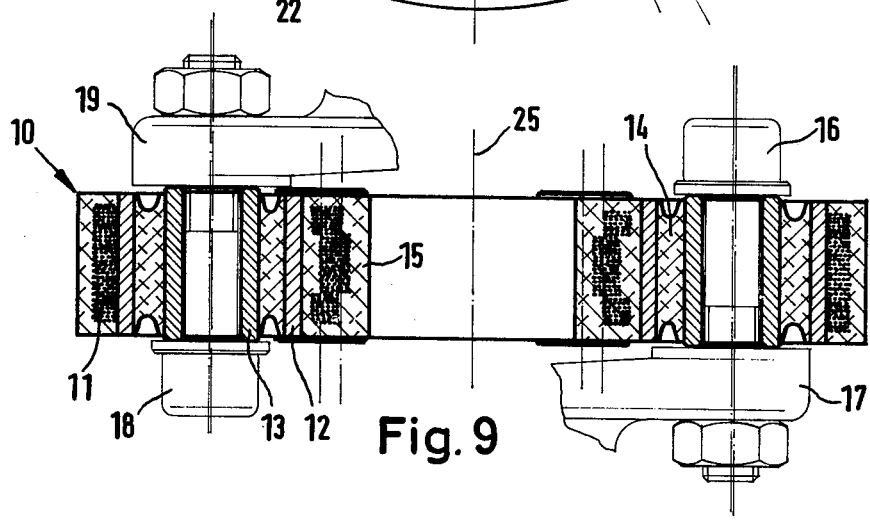

ELASTIC SHAFT PLATE FOR SHAFT COUPLINGS

BACKGROUND AND OBJECTS

The invention relates to an elastic shaft plate for shaft couplings, comprising sleeves disposed angularly spaced around a shaft plate axis, said sleeves being wrapped in pairs by string coils and embedded together with the coils in an elastomeric material.

In the present context of shaft plates the sleeves are to be understood as being elongated hollow bodies or bushings of annular but not necessarily circular cross section which are open at least at one end. As compared to the elastomeric material the sleeves are made of a hard material, normally steel. The thread or string coils may consist of the most varied kinds of filaments, such as cotton or synthetic filaments or steel strings, which may be placed loosely adjacent one another or may be interlaced by knitting or weaving. The preferred suitable elastomeric material, finally, is natural or synthetic rubber or any other elastomer in which the sleeves and the string coils may be embedded, in particular by vulcanization.

In known shaft plates of the kind specified (German Pat. Nos. 408 277, 439 241, and 509 999, German Application Print No. 10 21 212, and German Utility Model No. 19 97 154) the sleeves which are wrapped in pairs by string coils are so dimensioned that they each can just receive a coupling pin. In plan view the string coils preferably are elliptical and, in addition to the sleeves, form a loop around rubber pressure plates arranged between the sleeves (German Pat. No. 509 999 and German Application Print No. 10 21 212). The elasticity of the entire shaft plate can be determined within wide limits by appropriate shaping of the pressure plates. The greater the small major axis of the ellipses formed by the string coils is as compared to the outer diameter of the sleeves, the farther the sleeves joined by a string coil may move away from each other before the string coil adopts an extended position, whereupon it can yield further only by virtue of its natural elasticity.

However, in certain cases of application, above all in couplings between a differential gear and a gear shift mechanism of a motor vehicle, the known elastic shaft plates of the kind specified display a property considered disadvantageous in that, when transmitting minor torques, they do not afford sufficient dampening of rotational oscillations of the coupled shafts unless they have relatively low torsional rigidity over the full range of admissible loads. This means that at the maximum permissible torque load such shaft plates have a great torsional angle and store a correspondingly large amount of mechanical energy. In consequence of this property known as the "wind-up effect" such shaft plates pass on the energy stored in them to the driven shaft at relatively little dampening when the torque transmitted diminishes. In the case of motor vehicles this may lead to undesired pitching motions.

Therefore, it is an object of the present invention to provide an elastic shaft plate of the kind specified which is distinguished not only by a high specific loading capacity but also by particularly favorable dampening properties and good elasticity in the range of minor or medium torque loads and which, at the same time, avoids the disturbing wind-up effect at higher torque loads.

SUMMARY OF THE INVENTION

This object is met, in accordance with the invention, in that at least one sleeve of each pair of sleeves wrapped by a common string coil is an external sleeve receiving an internal body adapted to be fixed to one of two shafts to be coupled, a spacing being provided between said external sleeve and said internal body, said spacing likewise containing an elastomeric material. The internal bodies may be designed as internal sleeves so that they are adapted to receive coupling pins provided at a shaft flange or the like. It is also possible for the internal bodies themselves to be designed as coupling pins.

Thus multi-stage torque transmission is obtained between two shafts interconnected by a shaft plate in accordance with the invention. If, for instance, the driving shaft is connected rigidly with an internal body within each string coil, the first stage resides in the torque transmission from each of these internal bodies to the corresponding external sleeve through the elastomeric material positioned between the two. The second stage resides in the torque transmission from the external sleeves mentioned through a string coil each to a sleeve around which the same string coil is wrapped. If the latter sleeve also is an external sleeve arranged around an internal body and having a spacing with respect thereto and if said spacing between said external sleeve and said internal body is filled at least in part with an elastomeric material, a third stage of torque transmission is realized. Each of these stages has its own torsional angle and dampening characteristics.

The characteristics of the different stages may vary greatly, in dependence on the dimension of the external sleeves and internal bodies and in response to the extent to which said spacings are filled by elastomeric material. This is so even if the elastomeric material is the same all over, a condition desired to be fulfilled for reasons of manufacturing economy, yet not an absolute necessity. For example, the spacing between the external sleeves and the internal bodies may be so dimensioned and filled to such an extent with elastomeric material that the internal bodies move through greater distances inside the external sleeves than adjacent external sleeves move with respect to each other when the torque load on the shaft plate is low. Then the shaft plate has rather low torsional rigidity in the range of low torque loading, while it becomes more rigid and less flexible against torsion above a certain torque when the clearance of motion of the internal bodies inside the external sleeves is used up.

Thus the invention permits particularly close adaptation of elastic shaft plates to the conditions prevailing in any individual case, for example, to the torque characteristic of the engine and to the natural vibration behavior and inertia mass and the like of the cardan shaft in a motor vehicle. No comparable adaptability exists with known shaft plates of the kind specified or with conventional metal shaft plates provided with bores at circumferential spacings, with an external sleeve, a concentrically disposed internal sleeve, and an annular intermediate layer between the two inserted in each of said bores (German patent application Ser. No. 23936 published Aug. 6, 1953 and German Utility Model Ser. No. 69 28 176).

In a particularly preferred further development of the invention the width of the spacing, as seen in circumferential direction of the shaft plate, is smaller at least at one side of the internal body than the width of the spacing in radial direction of the shaft plate. This permits such limitation of the clearance of motion of each internal body within the corresponding external sleeve, at least in the principal direction of torque transmission, that the specific shearing stress of the elastomeric material disposed between the internal body and the external sleeve does not exceed a predetermined value at the maximum torque transmitted in said direction. Thus, a long service life of the material is warranted.

Said spacing having different dimensions in different directions may be realized, for example, with external sleeves of circular ring-shaped cross section in that the axis of the corresponding internal body is located offset with respect to the axis of the external sleeve in one of the two circumferential directions of the shaft plate.

An intermediate sleeve may be arranged between each external sleeve and the corresponding internal body. The axis of this intermediate sleeve coincides with or lies between the axes of the external sleeve and of the internal body. The intermediate sleeve thus may be disposed concentrically or eccentrically relative to the external sleeve and internal body. The spacing between the external sleeve and the internal body arranged concentrically or eccentrically within the external sleeve is subdivided into two annular spaces of corresponding reduced radial thickness so that the elastomeric material located in each of said annular spaces suffers only minor deformations even at high torque loading of the shaft plate. The elastomeric material consequently has a long lifetime.

In the area of its narrowest width the spacing between the external sleeve and the internal body or intermediate sleeve, respectively, may be formed by a void which is kept free of the elastomeric material. This makes it possible for the internal body or intermediate sleeve to come to lie directly or almost directly against the inner wall of the external sleeve when a certain torque loading is surpassed. And yet there is no risk that the elastomeric material will be destroyed by squeezing in the area of the closest approximation between the internal body or intermediate sleeve and the external sleeve. This is another factor to enhance the service life.

Instead of or, if desired, in addition to an eccentric arrangement of the internal bodies with regard to the corresponding external sleeves, the external sleeves may have an oblong cross sectional shape, the greatest diameter of which is located at least approximately on a radius of the shaft plate. With this arrangement there is a zone each in the two circumferential directions in which the spacing between the external sleeve and the internal body has a reduced width. For this reason this particular arrangement is especially well suited for shaft plates which are loaded alternatingly in one and the other circumferential direction. In accordance with the above, it is advantageous with such shaft plates if the spacing provided between the external sleeve and the internal body is constituted by a void each in both zones of reduced width, in other words if it is kept free of elastomeric material.

THE DRAWING

The invention will be described further, by way of example, with reference to the accompanying drawings, in which:

FIG. 3 is a top plan view of a second shaft plate;

FIG. 4 is an axial sectional view along line IV—IV of FIG. 3;

FIG. 5 is a top plan view of a third shaft plate;

FIG. 6 is an axial sectional view along line VI—VI of FIG. 5;

FIG. 7 is a part sectional view along line VII—VII of FIG. 5;

FIG. 8 is a top plan view of a fourth shaft plate;

FIG. 9 is an axial sectional view along line IX—IX of FIG. 8;

FIG. 10 is a part sectional view along line X—X of FIG. 8.

DETAILED DESCRIPTION

Figure 1:
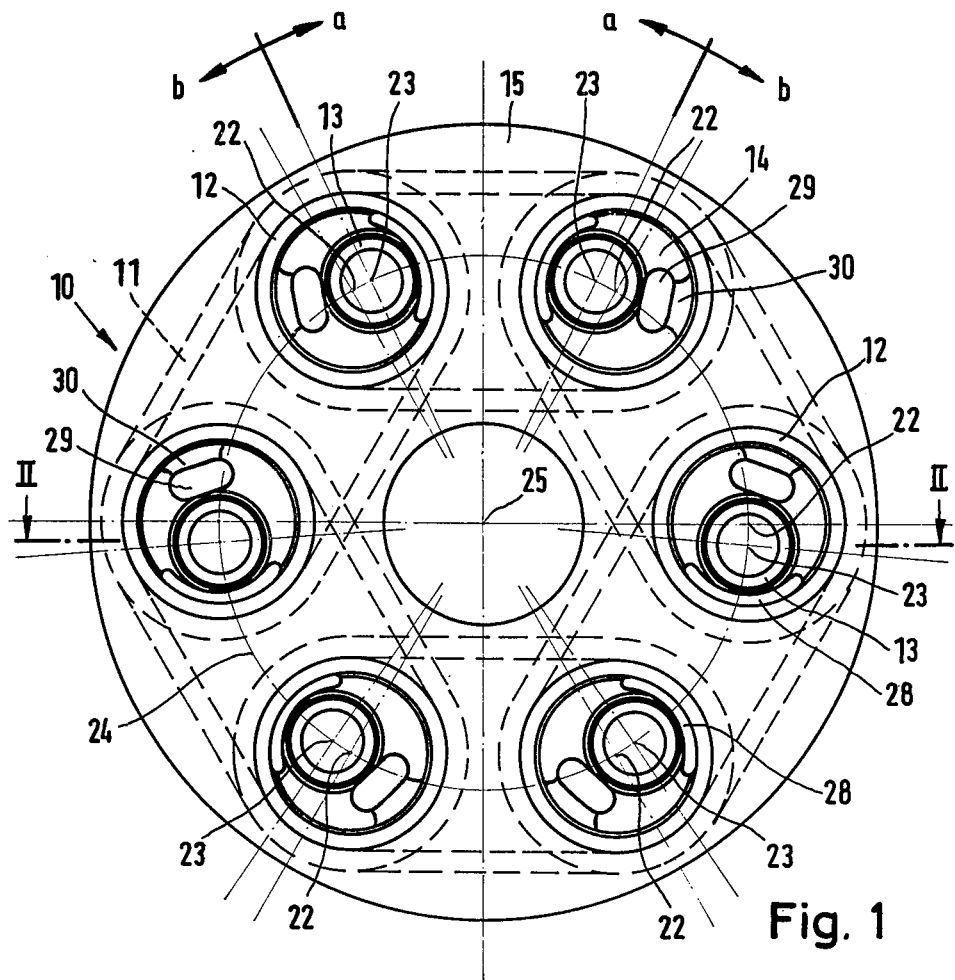
FIG. 1 is a top plan view of a first shaft plate.

An arrangement common to all the embodiments shown of a shaft plate 10 is the generally hexagonal disposition of a total of six thread or string coils 11 each of which forms a loop around a pair of external bushings or sleeves 12 of circular cylindrical shape. Thus two string coils 11 are wrapped around each individual external sleeve 12 in partly overlapping and crossing relationship. An internal bushing or sleeve 13 of circular cylindrical shape is arranged spaced within each external sleeve 12. The spacing between each external sleeve 12 and the corresponding internal sleeve 13 is partly filled with elastomeric material 14. Also the space between the external sleeves 12 is filled with an elastomeric material 15 in which the string coils 11 are completely embedded. The material 15 is defined, radially inside and outside, in such manner that the overall shape of the shaft plate 10 obtained is that of a circular ring.

As usual, each of the string coils 11 appearing as a unitary structure in the top plan views of FIGS. 1, 3, 5 and 8 may consist of a plurality of groups of thread or string windings offset in axial direction of the external sleeves 12, as may be gathered from FIGS. 7 and 10.

Figure 2:
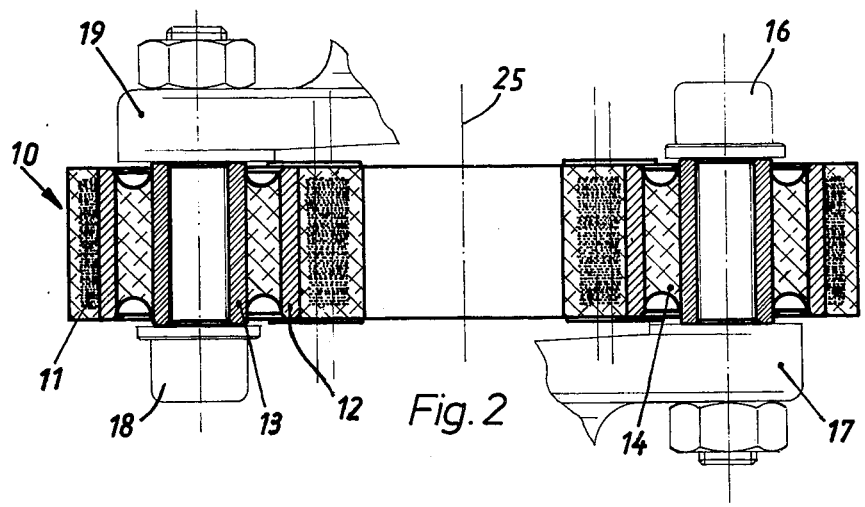
FIG. 2 is an axial sectional view along line II—II of FIG. 1.

In accordance with FIGS. 2, 4 and 9 every other internal sleeve 13 is destined to be fixed by means of a screw 16 to a flange 17 of a first shaft, while the intermediate internal sleeves 13 are each secured by a screw 18 to a flange 19 of a second shaft.

Another aspect common to all the embodiments shown is the fact that the axes 22 of all the external sleeves 12 and the axes 23 of all the internal sleeves 13 form a generatrix of a common cylinder 24 having for its axis the shaft plate axis 25. The axes 22 of the external sleeves 12 are positioned at even angular spacings of 60°. Moreover, also the string coils 11 within each shaft plate are alike since the external sleeves 12 of each of the shaft plates 10 shown have the same size.

With all embodiments shown the external sleeves 12 are firmly joined by vulcanization with the elastomeric materials 14 and 15, and the internal sleeves 13 are firmly united with the material 14, also by vulcanization.

In the case of the embodiment according to FIGS. 1 and 2, the axis 23 of each internal sleeve 13 is offset with respect to the axis 22 of the corresponding external sleeve 12 in one or the other circumferential direction of cylinder 24 in such manner that the internal sleeves 13 of two adjacent external sleeves 12 each are offset in opposite sense. As to extent, all axial offsettings are alike. Thus they differ in direction only in directly successive internal sleeves 13. As a consequence, the spacing between each internal sleeve 13 and the one but the next is not altered by the axial offsetting. Therefore, as usual, the flanges 17 and 19 of the shafts which are to be coupled by the shaft plate each are provided with three holes offset by 120° for insertion of a screw 16 or 18 each.

With the embodiment shown in FIGS. 1 and 2, the spacing between each external sleeve 12 and the corresponding internal sleeve 13 is kept free in its narrowest portion by a void 28 which is not filled by the elastomeric material 14. Each void 28 is disposed concentrically with the axis 22 of the corresponding external sleeve 12 and substantially has the shape of a sector of a circular ring, its ends however being rounded off. Another void 29 offset by about 180° from the center of void 28 is kept free of the elastomeric material 14 in the space between each external sleeve 12 and the corresponding internal sleeve 13. The major part of each void 29 lies outside of cylinder 24 and each void 29 is defined, on the one hand, by the corresponding internal sleeve 13 and, on the other hand, by an abutment or stop 30. As may be gathered from FIG. 1, the stops 30 preferably are positioned entirely outside of cylinder 24. Preferably they are formed of the material of the external sleeves 12 themselves, as by stamping. Yet they may also be independent structural elements. Alternatively, projections may be formed at the internal sleeves 13.

The shaft plate 10 shown in FIGS. 1 and 2 is relatively stiff against torque loads in the direction of arrows a. Such loads tend to reduce the width of voids 28 and may go as far as to cause each internal sleeve 13 to lie against the corresponding external sleeve 12 without any harm to the shaft plate. The torque-torsion angle characteristic (torque being taken as the ordinate and torsion angle as the abscissa) begins with a short flat rise, at the end of which the internal sleeves 13 abut against the external sleeves 12. This is followed by a steep rise because, with increasing torque, it is only the string coils 11 which yield, whereas no further relative movement takes place between the internal sleeves 13 and the external sleeves 12.

The shaft plate 10 according to FIGS. 1 and 2 is much softer or more flexible against torque loads in the direction of arrows b because voids 29 are much wider than voids 28. The torque-torsion angle characteristic begins with a relatively long flat rise, at the end of which the internal sleeves 13 abut against stops 30. This is followed by a sharp rise, the steepness of which depends only on the elasticity of the string coils 11 and of the elastomeric material 15 surrounding the same, as is the case with loads in the direction of arrows a. Stops 30 serve to prevent undue stressing of the elastomeric material 14 in the vicinity of voids 29.

The reason why the larger part of each void 29 and all of the stops 30 of the embodiment according to FIGS. 1 and 2 are positioned entirely outside of cylinder 24 may be explained as follows: In the event of any pure twisting of the two flanges 17 and 19 with respect to each other, not superimposed by any relative motions transversely of the shaft plate axis 25, the axes 23 of all internal sleeves 13 travel along on cylinder 24, with the axes 22 of the external sleeves 12 move somewhat closer to the shaft plate axis 25 and the external sleeves 12, at the same time, are twisted a little. Upon application of loads in the direction of arrows b the external sleeves 12 are twisted such that stops 30 approach the axis 25 of the shaft plate. Consequently each internal sleeve 13 comes to lie at least approximately against the middle of the corresponding stop 30.

What has been said with regard to the embodiment shown in FIGS. 1 and 2 substantially also applies to the embodiment according to FIGS. 3 and 4 as far as the offsetting of the axes 23 of the internal sleeves 13 relative to the axes 22 of the external sleeves 12 is concerned. An essential difference resides in the fact that, in accordance with FIGS. 3 and 4, an intermediate bushing or sleeve 31 is disposed between and spaced from each external sleeve 12 and the corresponding internal sleeve 13. The axis of each intermediate sleeve 31 is offset from the axis 22 of each external sleeve 12 in the same direction as the axis 23 of each internal sleeve 13, yet to a lesser extent. The elastomeric material 14 practically completely fills the spaces left between the intermediate sleeve 31 and the external and internal sleeves, respectively.

In the embodiment shown in FIGS. 5 to 7, the axis 22 of each external sleeve 12 at the same time constitutes the axis of the corresponding internal sleeve 13. Yet here again the spacing between the external sleeve 12 and the internal sleeve 13 differs in width. This is obtained, in the present embodiment, by the fact that the outer sleeves 12, instead of having a circular ring shaped cross section, have an oval or elliptical cross section resulting, for instance, from compression of an originally circular annular tube section. What is essential is that the greatest diameter of each external sleeve 12 must lie approximately or preferably directly, as shown, on a radius starting from the shaft plate axis 25. The width of the spacing between the external sleeve 12 and the internal sleeve 13 has two maximum values located on said radius and two minimum values each offset with respect to the maximum values by about 90° so that they lie approximately on a tangent to cylinder 24. In the area of these minimum values the spacing between the external sleeve 12 and the internal sleeve 13 is kept free of elastomeric material 14 so that two voids 28 roughly of ring sector shape are formed opposite each other.

The shaft plate illustrated in FIGS. 5 to 7 can be subjected to the same degree of torque load in both circumferential directions and has the same torque-torsion angle characteristic in both directions.

The embodiment shown in FIGS. 8 to 10 correspond to that according to FIGS. 1 and 2 except for the fact that all the internal sleeves 13 are offset in the same circumferential direction with respect to the external sleeves 12. When subjected to load in the direction of arrows a the torque-torsion angle characteristic is the same as with loads in the direction of arrows b. In both cases the curve begins with a short flat rise which lasts until every other internal sleeve 13 has overcome the corresponding void 28. This is followed by a somewhat steeper rise which ends when the other internal sleeves have reached the corresponding stops 30. Thus the relative motion of all internal sleeves 13 with respect to the external sleeves 12 terminates. Upon further increase of the torque transmitted by the shaft plate 10 the curve becomes even steeper since it now depends only on the elasticity of the string coils 11 and of the elastomeric material 15 surrounding the same.

What is claimed is:

1. An elastic shaft plate for shaft couplings, comprising sleeves disposed angularly spaced around a shaft plate axis, said sleeves being wrapped in pairs by string coils and embedded together with the coils in an elastomeric material, wherein at least one sleeve of each pair of sleeves wrapped by a common string coil is an external sleeve receiving an internal body adapted to be fixed to one of two shafts to be coupled, a spacing being provided between said external sleeve and said internal body, said spacing likewise containing an elastomeric material, the width of said spacing in circumferential direction of said shaft plate at least at one side of said internal body being smaller than the width of said spacing at either side of said internal body in radial direction of said shaft plate.

2. A shaft plate as claimed in claim 1, wherein the external sleeves have a circular ring-shaped cross section and at least one external sleeve of each pair of external sleeves receives an internal body the axis of which is located offset with respect to the axis of said external sleeve in one of the two circumferential directions of the shaft plate.

3. A shaft plate as claimed in claim 2, wherein the other external sleeves receive an internal body each the axis of which is located offset in the opposite circumferential direction of the shaft plate.

4. A shaft plate as claimed in claim 1, wherein an intermediate sleeve is arranged between each external sleeve and the corresponding internal body.

5. A shaft plate as claimed in claim 2, wherein an intermediate sleeve is arranged between each external sleeve and the internal body, the axis of said intermediate sleeve being located between the axes of said external sleeve and of said internal body.

6. A shaft plate as claimed in claim 2, wherein said spacing between said external sleeve and said internal body is formed by a void in the area of its narrowest width.

7. A shaft plate as claimed in claim 6, wherein at least one opening is provided in the spacing between said external sleeve and said internal body, which opening is offset with respect to said void.

8. A shaft plate as claimed in claim 1, wherein said external sleeves have an oblong cross section, the greatest diameter of which is located at least approximately on a radius of the shaft plate, the spacing between each external sleeve and the corresponding internal body thus having two areas of reduced width.

9. A shaft plate as claimed in claim 8, wherein the spacing between each external sleeve and the corresponding internal body is formed by a void each in both areas of reduced width.

10. A shaft plate as claimed in claim 2, wherein the relative movement in circumferential direction of at least one external sleeve of each pair of external sleeves with respect to the corresponding internal body is limited by a stop disposed between the substantially circular cylindrical inner surface of said external sleeve and the substantially circular cylindrical outer surface of said internal body at the position at which these cylindrical surfaces have their greatest spacing from each other, and wherein said elastomeric material arranged between said external sleeve and said internal body has a void adjacent said stop, which void permits direct power transmission from said internal body to said external sleeve when the torque loading of the shaft plate exceeds a certain limit.

11. A shaft plate as claimed in claim 10, wherein each of said stops together with the corresponding voids is at least largely positioned outside of a cylinder defined by the axes of all internal bodies.

* * * * *